United States Patent
Wendt

Patent Number: 5,185,201
Date of Patent: Feb. 9, 1993

[54] LAMINATES FOR PROTECTING INCOMPLETELY DRY SURFACES

[75] Inventor: Peter W. Wendt, Franklin, Wis.

[73] Assignee: Georgia-Pacific Corporation, Atlanta, Ga.

[21] Appl. No.: 560,119

[22] Filed: Jul. 31, 1990

[51] Int. Cl.⁵ .......................... B32B 3/30; D04H 1/58; D04H 1/04

[52] U.S. Cl. .................................. 428/296; 428/186; 428/286; 428/288

[58] Field of Search ................. 428/286, 288, 296, 186

[56] References Cited

U.S. PATENT DOCUMENTS

| | | | |
|---|---|---|---|
| 4,656,082 | 4/1987 | Goodacre et al. | 428/286 |
| 4,798,603 | 1/1989 | Mayer et al. | 604/378 |
| 4,801,494 | 1/1989 | Datta et al. | 428/286 |

Primary Examiner—George F. Lesmes
Assistant Examiner—Kathryne E. Shelbourne
Attorney, Agent, or Firm—Banner, Birch, McKie & Beckett

[57] ABSTRACT

Diecut or otherwise cut or formed pieces of a laminate for providing temporary surface protection to the incompletely dry surface coating on a flat or planar article such as metal nameplates, control panel bezels, dials, name tags and the like. Such flat or planar metal articles are widely used on appliances and machines where permanence and good readability are important. The individual laminated pieces are cut, with or without scoring, from sheets formed by laminating a ply of spunbonded polypropylene to a ply of chipboard or other inexpensive solvent absorbing backing material. In use the spundbonded polypropylene surface of a piece of the laminate is placed against the incompletely dry surface coating to be protected of a nameplate or like article and the combination is packaged together with other similar combinations for shipment. When the thus-protected articles are unpacked the pieces of laminate are separated from the articles and returned to the manufacturer of the nameplates for re-use in future shipments. The surface of a ply of spunbonded polypropylene does not damage or adhere to the incompletely dry surface coating on a nameplate and the ply allows the residual solvent of the coating to pass through and be absorbed in the chipboard or other backing ply.

2 Claims, 1 Drawing Sheet

LAMINATES FOR PROTECTING INCOMPLETELY DRY SURFACES

This invention relates generally to laminates which are useful for protecting incompletely dry surfaces of flat or planar articles such as nameplates, the surfaces of which have received a protective or finish coating which has not been completely dried or freed of residual solvent. More specifically, such laminates are formed from a backing ply of chipboard or other inexpensive absorbent backing material to at least one surface of which a ply or layer of spunbonded polypropylene has been laminated. Pieces of desired shapes and sizes are die cut or otherwise formed from larger sheets of such laminates and used and re-used several times for protecting during packing and shipment the incompletely dry surfaces of flat or planar articles such as metal nameplates, control panel bezels, dials, nametags and the like.

BACKGROUND OF THE INVENTION

Many appliances and machines require the attachment of permanent type nameplates, control panel bezels, dials, nametags and the like. For example, household appliances such as washers, dryers, dishwashers, compactors, ovens, mixers etc. require the attachment of permanent nameplates and control panel bezels. Likewise, industrial machines, vehicles, office machines and the like require permanent nameplates, control panel bezels, dials, nametags and the like. Usually, the manufacturers or fabricators of such appliances and machines do not make their own nameplates and the like for attachment to their products. Instead, the manufacturers and the producers of appliances and machines usually procure their nameplates and the like from firms that specialize in the production of such articles.

Since nameplates, bezels, dials, nametags and the like are required to be permanent, it has been customary to manufacture the same from thin sheet metal, preferably aluminum, the front surface of which has been coated such as by an electrostatic coating, engraved with suitable lettering numbers, designs or other indicia and then overcoated with a solvent-base finish or protective surface coating. Most of the solvent from the finish coating is removed in relatively short drying periods but considerable time is required to completely remove the residual amounts or final traces of solvent so that the surfaces of the nameplates or similar articles are completely dry and safe to handle.

In order to expedite shipment of nameplates and the like the coated surfaces of which are not completely dry, it has been the practice to overwrap each such nameplate or article with a cut-to-size piece of polypropylene foam in sheet form and then package the overwrapped nameplates or the like in multiple quantities for shipment. Normally, by the time the shipments have been received by an appliance or machine manufacturer and unpacked for attachment to an appliance or machine, the residual solvent will have escaped from the incompletely dry surfaces through the overwrapping of polypropylene foam. Heretofore, it has been the practice of the customer on removal of the overwrappings of polypropylene foam to discard the same for disposal with other trash. However, environmental questions have been raised concerning the disposal of large quantities of polypropylene foam material and in some instances refusal to accept the same for disposal has been encountered. Accordingly, there is a demand for a different way and material to replace polypropylene foam for protecting the incompletely dry finished surfaces of nameplates and the like during shipment which will not be objectionable from the environmental standpoint.

The object of the present invention, generally stated is the provision of a replacement or substitute material to replace the previously used polypropylene foam overwrapping for protecting the incompletely dry surfaces of nameplates and the like during shipment, and which will allow complete drying to occur and which will not be environmentally objectionable when it becomes necessary to dispose of the replacement or substitute material after it has been re-used a number of times.

The object of the invention has been satisfactorily achieved by the provision of laminates comprising an inexpensive backing ply of chipboard or similar material having an adequate capability of absorbing residual solvents and to which is bonded or laminated a ply of spunbonded polypropylene.

Certain more specific objects of the invention will become apparent from the following detailed description of the invention taken in connection with the accompanying drawings wherein.

Figure 1:
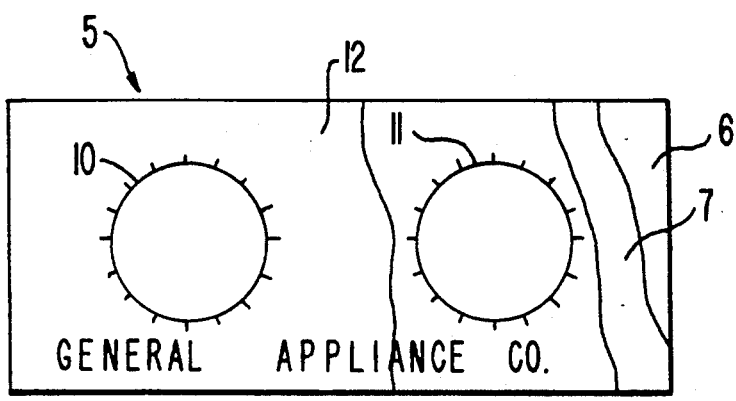
FIG. 1 is a plan view of a representative nameplate for an appliance depicting the metal backing or substrate and the layers of coating and the etching applied thereto.

Referring to FIG. 1, a nameplate for an appliance (e.g. automatic washer, dishwasher, compactor, dryer, oven, etc.) is indicated generally at 5. It comprises a substrate 6, preferably a thin piece of aluminum or other metal, a first coating 7 that may be electrostatically applied, etched dials 10 and 11 and the name "GENERAL APPLIANCE", and a transparent finish or overcoating 12. The overcoating 12 as applied include a volatile solvent component most of which was removed during the primary drying which the nameplate 5 underwent in manufacture. It will be understood that the nameplate 5 is representative of other generally flat or planar articles such as nameplates with other types of indicia, control panel bezels, gauge dials or automobiles or other vehicles, computers, copiers, etc.

While most of the solvent can be removed rapidly from the overcoating 12, the removal of the relatively small residual amounts of the solvent is time consuming and will occur naturally during normal handling and shipment provided the overcoating is protected with a compatible material through which the residual solvent can escape. It will be understood that any protective material used to contact the incompletely dry overcoating 12 must not only be sufficiently permeable to allow the residual solvent to pass or migrate through but also must be compatible with the incompletely dry coating so as not to disturb the finish in anyway and be readily removable. As mentioned above, polypropylene foam has been one such material that has served well as a protective overwrapping. However, polypropylene foam overwrapping is not suitable for re-use after removal and has raised environmental concern with respect to its disposal.

Figure 2:
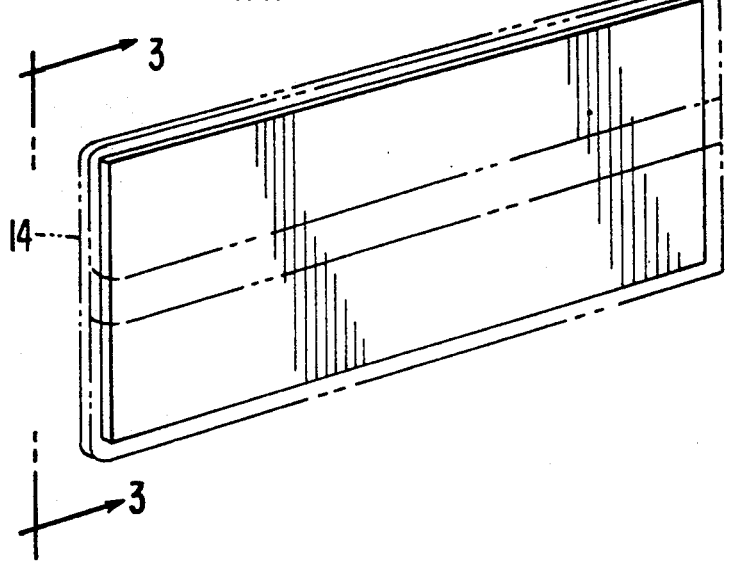
FIG. 2 is a perspective view showing a nameplate overwrapped with polyethylene foam material.
Figure 3:
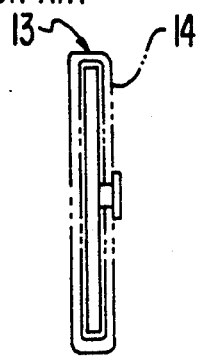
FIG. 3 is an end elevation view taken on line 3—3 of FIG. 2.

Referring to FIGS. 2 and 3, a nameplate is indicated generally at 13 therein which is an exemplar of other nameplates and similar articles. The nameplate 13 is shown as being overwrapped in a piece of polypropylene foam indicated in broken line 14.

Figure 4:
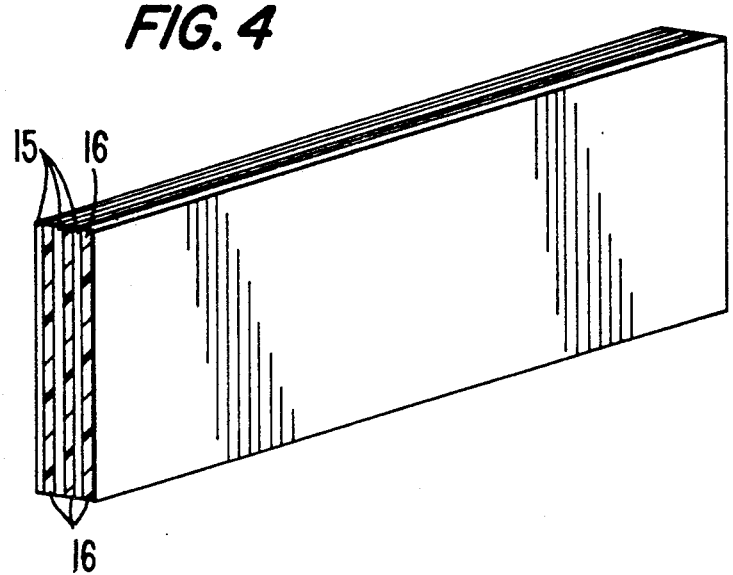
FIG. 4 is a perspective view showing several nameplates grouped together for shipment with separators in the form of laminates embodying the present invention.
Figure 5:
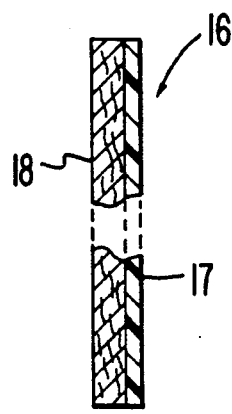
FIG. 5 is an enlarged sectional view of a laminate embodying the present invention.

Referring to FIGS. 4 and 5, in FIG. 4 an assembly of 3 exemplar nameplates are indicated generally at 15 the outer or finished surfaces are of which protected by pieces of laminate 16—16 made in accordance with the present invention. The pieces of laminate 16 are die cut or otherwise formed from larger sheets produced by laminating a ply 17 of spunbonded propylene to a backing ply 18 of chipboard utilizing a suitable adhesive such as acrylic adhesive of known type. The resulting laminate is sheeted, perforated or die cut, utilizing known equipment and procedures in the same manner that chipboard and similar sheet materials have been formed into pieces of suitable size and shape for other purposes.

Instead of using chipboard as the semi-rigid backing ply 18, other inexpensive back materials may be used having similar capability of absorbing residual amounts of solvent transported through the ply of spunbonded polypropylene 17, such as corrugated boxboard, groundwood papers, bogus board or Kraft papers.

It has been found that a preferred form of spunbonded polypropylene suitable for the ply 17 is of the type utilized as the inner liner for disposable diapers. One such suitable material for the ply 17 is available from Kimberly-Clark Corporation of Neenah, Wis. and is composed of liquid permeable, substantially hydrophobic fibers material, namely, a spunbonded web composed of polypropylene filaments. This material is presently used as the liner of disposable diapers. Other suitable synthetic polymer filaments may be used including for example, polyethylene and polyesters. The polymer filaments may have a denier within the range of about 1.5-7, and preferably a denier within the range of about 1.5-3. The filaments are arranged to form a layer having a basis weight within the range of about 0.6-1.0 oz./yd. 2 oz., and preferably a basis weight of about 0.8 oz./2 yd. In addition, the spunbonded polypropylene ply has a bulk thickness within the range of about 0.008-0.017 inches and preferably a bulk thickness within the range of about 0.010-0.012 inch. The bulk thickness is measured under a restraining pressure of 0.014 pressure inch. The ply 17 has a pore size that readily allows the passage therethrough of solvent. The pore size in terms of equivalent circular diameter is within the range of about 40-110 micrometers, and preferably within the range of about 70-110 micrometers. The chipboard ply 18 may have a thickness within the range of about 0.010 to 0.020 inch with the protective separator 16 having an overall thickness within the range of about 0.012 to 0.021 inch.

The separators 16 can be readily inserted between nameplates and the like of the same dimensions during packing for shipment and thereafter readily removed during unpacking. Because they are semi-rigid and have the same dimensions, the separator 16 upon being removed can be readily and conveniently packed and returned to the nameplate manufacturer for re-use up to as many as five times. In addition to being re-usable when it becomes necessary for disposable the separators 16 occupy a smaller volume than the previously used overwrappers of polypropylene foam. Furthermore, the assemblies shown in FIG. 4 are much more compact than assemblies previously made with overwrappers of polypropylene foam and less time is required to insert and remove the separators 16 from the assemblies than required for applying and removing the overwrappers 14 of polypropylene foam. Accordingly, from the standpoints of reduced cost, ease of handling and elimination or minimizing of environmental concerns on disposal, the separator laminates 16 are much to be preferred over the overwrappers 14 of polypropylene foam.

In addition to the changes previously mentioned that may be made in the separator laminate 16 it will be understood that other changes and modifications may be made without departing from the spirit and scope of the invention. For example, a laminated separator 16 may be formed from sheets wherein spunbonded polypropylene plies 17 are bonded or laminated to both faces or sides of a backing ply 18 of chipboard or other material. In use, separators formed from such double faced materials are inserted between a pair of nameplates thereby reducing in half the number of separators required for insertion and removal. Instead of laminating spunbonded polypropylene to both sides of a backing ply of chipboard, a similar result can be obtained by laminating the ply of spunbonded polypropylene to one side of a ply of chipboard and then providing the separator with a score line during die cutting so that the die cut piece can be folded over with the chipboard on the inside thus presenting a double faced separator for insertion between two nameplates. Further, there may be requirements for a separator in which a ply of spunbonded polypropylene of the size of the nameplate to be protected is laminated to a restricted area of a piece of chipboard or other similar backing material and the chipboard is suitably scored or perforated so that areas or portions not covered by the polypropylene ply can be folded over the backside of a nameplate the finish surface of which engages the piece of spunbonded polypropylene.

What is claimed:

1. A reusable separator for separating a first planar article from a second planar article during packing and shipping, said first planar article having a first side exhibiting a solvent-based overcoating containing a residual amount of solvent, said separator comprising:
   a first layer comprising a semi-rigid backing ply of a solvent absorbent material selected from the group consisting of chipboard, corrugated boxboard, groundwood papers, bogus board and Kraft papers, said first layer exhibiting a planar shape having a first side and a second side; and
   a second layer comprising a solvent permeable ply, wherein said solvent permeable ply comprises a material selected from the group consisting of spunbounded polypropylene and spunbounded polyesters, said second layer exhibiting a planar shape having a first surface and a second surface, wherein said first surface is laminated to said first side of said first layer and said second surface is an exposed surface for contacting said overcoating during packing and shipping, wherein said exposed surface does not damage or adhere to said overcoating when in contact with said overcoating during packing and shipping, and wherein said solvent escapes from said overcoating through said solvent permeable ply during packing and shipping.

2. The separator of claim 1, wherein said solvent permeable ply is a spunbonded polypropylene ply.

* * * * *

UNITED STATES PATENT AND TRADEMARK OFFICE
CERTIFICATE OF CORRECTION

PATENT NO. : 5,185,201

DATED : February 9, 1993

INVENTOR(S) : Peter W. Wendt

It is certified that error appears in the above-identified patent and that said Letters Patent is hereby corrected as shown below:

Claim 1, Column 4, line 54, change "spunbounded" to --spunbonded--, both occurrences.

Signed and Sealed this

Ninth Day of November, 1993

Attest:

BRUCE LEHMAN

*Attesting Officer*     *Commissioner of Patents and Trademarks*